United States Patent
Zhang et al.

(10) Patent No.: US 9,298,330 B2
(45) Date of Patent: Mar. 29, 2016

(54) CAPACITIVE TOUCH PANEL HAVING COMPLEMENTARILY MATCHING ADJACENT ELECTRODE UNITS AND DISPLAY DEVICE INCLUDING THE CAPACITIVE TOUCH PANEL

(71) Applicants: BOE TECHNOLOGY GROUP CO., LTD., Beijing (CN); Chengdu BOE Optoelectronics Technology Co., Ltd., Chengdu, Sichuan Province (CN)

(72) Inventors: Tian Zhang, Beijing (CN); Tianma Li, Beijing (CN); Haodi Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 14/369,267

(22) PCT Filed: Dec. 9, 2013

(86) PCT No.: PCT/CN2013/088870
§ 371 (c)(1),
(2) Date: Jun. 27, 2014

(87) PCT Pub. No.: WO2015/027610
PCT Pub. Date: Mar. 5, 2015

(65) Prior Publication Data
US 2015/0220175 A1 Aug. 6, 2015

(30) Foreign Application Priority Data
Aug. 30, 2013 (CN) .......................... 2013 1 0389320

(51) Int. Cl.
*G06F 3/041* (2006.01)
*G06F 3/044* (2006.01)
(52) U.S. Cl.
CPC ...... *G06F 3/044* (2013.01); *G06F 2203/04112* (2013.01)

(58) Field of Classification Search
USPC .......................................................... 345/173
See application file for complete search history.

(56) References Cited

U.S. PATENT DOCUMENTS

| 7,382,139 B2 * | 6/2008 | Mackey | ................. G06F 3/044 324/660 |
| 7,548,073 B2 * | 6/2009 | Mackey | ............... G01D 5/2415 324/660 |

(Continued)

FOREIGN PATENT DOCUMENTS

| CN | 101387934 A | 3/2009 |
| CN | 102203698 A | 9/2011 |
| CN | 103186306 A | 7/2013 |

OTHER PUBLICATIONS

Search Report issued in International Application No. PCT/CN2013/088870, twelve (12) pages.

(Continued)

*Primary Examiner* — Roy Rabindranath
(74) *Attorney, Agent, or Firm* — Nath, Goldberg & Meyer; Joshua B. Goldberg; Leonid D. Thenor

(57) ABSTRACT

The present invention provides capacitive touch panel, and display device. The capacitive touch panel of the present invention comprises at least one column of electrode set, the electrode set comprising a plurality of electrode units sequentially arranged, and adjacent electrode units complementarily matching each other, wherein each electrode unit comprises first touch electrode, second touch electrode and third touch electrode, the first, second and third touch electrodes complementarily match each other, and the first touch electrode is used for keeping patterns of the second touch electrode and the third touch electrode included in the same electrode unit from contacting with each other, the second touch electrode is used for keeping pattern of the electrode unit from contacting with pattern of immediately previous electrode unit, and the third touch electrode is used for keeping the pattern of the electrode unit from contacting with pattern of immediately next electrode unit.

20 Claims, 2 Drawing Sheets

(56) References Cited

U.S. PATENT DOCUMENTS

| | | | | |
|---|---|---|---|---|
| 2007/0257894 | A1* | 11/2007 | Philipp | G06F 3/044 345/173 |
| 2008/0225015 | A1* | 9/2008 | Hashida | 345/173 |
| 2009/0073135 | A1* | 3/2009 | Lin et al. | 345/173 |
| 2010/0123670 | A1* | 5/2010 | Philipp | G06F 3/044 345/173 |
| 2011/0157043 | A1* | 6/2011 | Lai et al. | 345/173 |
| 2011/0279406 | A1 | 11/2011 | Kawaguchi et al. | |

OTHER PUBLICATIONS

First Office Action dated Oct. 9, 2015 corresponding to Chinese application No. 201310389320.6.

Written Opinion of International Searching Authority dated Jun. 5, 2014 corresponding to International application No. PCT/CN2013/088870.

* cited by examiner

CAPACITIVE TOUCH PANEL HAVING COMPLEMENTARILY MATCHING ADJACENT ELECTRODE UNITS AND DISPLAY DEVICE INCLUDING THE CAPACITIVE TOUCH PANEL

This is a National Phase Application filed under 35 U.S.C. 371 as a national stage of PCT/CN2013/088870, filed Dec. 9, 2013, and claims priority benefit from Chinese Application No. 201310389320.6, filed Aug. 30, 2013, the content of each of which is hereby incorporated by reference in its entirety.

FIELD OF THE INVENTION

The present invention relates to the field of touch technology, and particularly to a capacitive touch panel and a display device.

DESCRIPTION OF THE RELATED ART

Touch panel, as a brand new input device, has drawn more and more attention because of its characteristics of quick response, convenient use, good human-computer interaction, and the like. According to different technical principles, touch panels may be mainly classified into resistive touch panels and capacitive touch panels. As resistive touch panels cannot be controlled in multi-touch mode, many manufacturers are paying more attention to the development and research on capacitive touch panels.

As a relatively common configuration of a capacitive touch panel, an existing capacitive touch panel is generally implemented by using bilayer electrode in which electrodes in the upper layer and electrodes in the lower layer are arranged to intersect with each other, or monolayer electrode with metal bridge. The principle thereof may be described as follows: due to human body induction electric field, capacitance value at a position where a row and a column of touch panel matrix intersect with each other is changed when a user's finger touches on a surface of a touch panel, and the specific position of the area touched by the finger may be accurately calculated by detecting change in this capacitance value.

However, the inventors have found that at least the following problems exist in the prior art: an existing capacitive touch panel has a relatively complicated structure, and therefore, the manufacturing process of the existing capacitive touch panel is relatively complex, which finally results in a relatively high production cost of the existing capacitive touch panel.

SUMMARY OF THE INVENTION

The present invention provides a capacitive touch panel which has simple structure, shortened manufacturing process and relatively low production cost, and a display device.

To solve the above technical problems, the present invention adopts the technical solutions as below.

A capacitive touch panel comprises at least one column of electrode set, the electrode set comprising a plurality of electrode units which are sequentially arranged, and adjacent electrode units complementarily matching each other, wherein each electrode unit comprises a first touch electrode, a second touch electrode and a third touch electrode, the first touch electrode, the second touch electrode and the third touch electrode complementarily match each other, and the first touch electrode is used for keeping patterns of the second touch electrode and the third touch electrode included in the same electrode unit from contacting with each other, the second touch electrode is used for keeping a pattern of the electrode unit from contacting with a pattern of an immediately previous electrode unit, and the third touch electrode is used for keeping the pattern of the electrode unit from contacting with a pattern of an immediately next electrode unit.

Further, a dummy electrode is provided between adjacent electrode units, such that intervals between adjacent electrode units are the same.

Further, at least one layer of insulation shielding layer is further provided between the adjacent electrode units.

Preferably, a material of the electrode unit is indium tin oxide (ITO).

Further, a pattern of the first touch electrode is any one of square, rectangle and parallelogram; a pattern of the second touch electrode and a pattern of the third touch electrode are any one of triangle and trapezoid, respectively.

Preferably, the pattern of the second touch electrode and the pattern of the third touch electrode are the same.

According to another aspect, the present invention provides a display device comprising the above-described capacitive touch panel.

The capacitive touch panel with the above structure provided by the present invention has simple structure, which shortens the process procedure for manufacturing the capacitive touch panel, and lowers the production cost at the same time.

BRIEF DESCRIPTION OF THE DRAWINGS

To describe the technical solutions of the embodiments of the present invention or the technical solutions in the prior art more clearly, the accompanying drawings to be used in the description of the embodiments or the prior art will be briefly introduced. Obviously, the accompanying drawings in the following description illustrate merely some embodiments of the present invention, and for those skilled the art, other drawings can be obtained based on these accompanying drawings without creative efforts.

DETAILED DESCRIPTION OF THE PREFERRED EMBODIMENTS

The present invention provides a capacitive touch panel, which has simple structure, greatly shortened manufacturing process and low production cost, and a display device.

Those skilled in the art should understand that, the embodiments of the present invention are merely used for explaining the present invention instead of limiting the present invention. In some conditions, detailed descriptions of well-known devices, circuits and methods are omitted to avoid that unnecessary details obscure the description of the present invention.

The embodiments of the present invention will be described in detail below.

The embodiment of the present invention provides a capacitive touch panel, which comprises at least one column of electrode set each comprising a plurality of electrode units which are sequentially arranged, and adjacent electrode units complementarily match each other, wherein each electrode unit comprises a first touch electrode, a second touch electrode and a third touch electrode, the first touch electrode, the second touch electrode and the third touch electrode complementarily match each other, and the first touch electrode is used for keeping patterns of the second touch electrode and the third touch electrode included in the same electrode unit from contacting with each other, the second touch electrode is used for keeping a pattern of the electrode unit in which the second touch electrode is included from contacting with a pattern of an immediately previous electrode unit, and the third touch electrode is used for keeping the pattern of the electrode unit in which the third touch electrode is included from contacting with a pattern of an immediately next electrode unit.

The capacitive touch panels provided by the embodiments of the present invention are further described in conjunction with the drawings.

Figure 1:
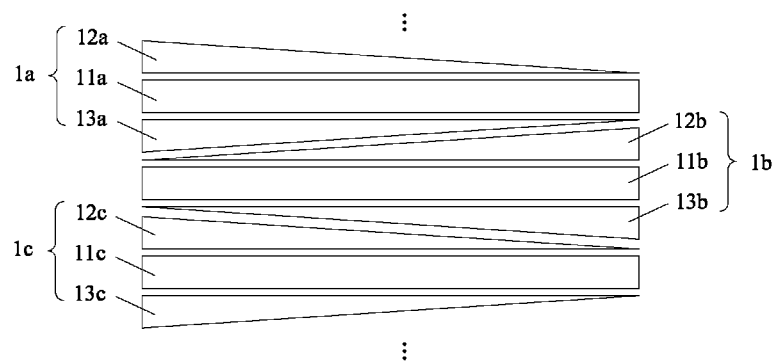
FIG. 1 is a schematic diagram of a structure of a capacitive touch panel of an embodiment of the present invention.

As illustrated in FIG. 1, FIG. 1 is a schematic diagram of a structure of a capacitive touch panel provided by an embodiment of the present invention. The capacitive touch panel includes at least one column of electrode set (only one column of electrode set are illustrated in FIG. 1), and each column of electrode set includes an electrode unit $1a$, an electrode unit $1b$, an electrode unit $1c$, etc., which are sequentially arranged, wherein the electrode unit $1a$ complementarily matches the electrode unit $1b$, and the electrode unit $1b$ complementarily matches the electrode unit $1c$, as shown in FIG. 1. Further, each electrode unit includes a first touch electrode, a second touch electrode and a third touch electrode, and the first, second and third touch electrodes complementarily match each other. For example, the first, second and third touch electrodes $11a$, $12a$ and $13a$ included in the electrode unit $1a$ complementarily match each other. Here, the first touch electrode included in each electrode unit is used for keeping patterns of the second and third touch electrodes included in the same electrode unit from contacting with each other, the second touch electrode is used for keeping a pattern of the electrode unit from contacting with a pattern of an immediately previous electrode unit, and the third touch electrode is used for keeping the pattern of the electrode unit from contacting with a pattern of a immediately next electrode unit. For example, as shown in FIG. 1, taking the electrode unit $1b$ as an example, the first touch electrode $11b$ included in the electrode unit $1b$ keeps the patterns of the second and third touch electrodes $12b$ and $13b$ included in the same electrode unit from contacting with each other; the second touch electrode $12b$ included in the electrode unit $1b$ keeps the pattern of the electrode unit $1b$ from contacting with the pattern of its immediately previous electrode unit $1a$; and the third touch electrode $13b$ included in the electrode unit $1b$ keeps the pattern of the electrode unit $1b$ from contacting with the pattern of its immediately next electrode unit $1c$.

Figure 2:
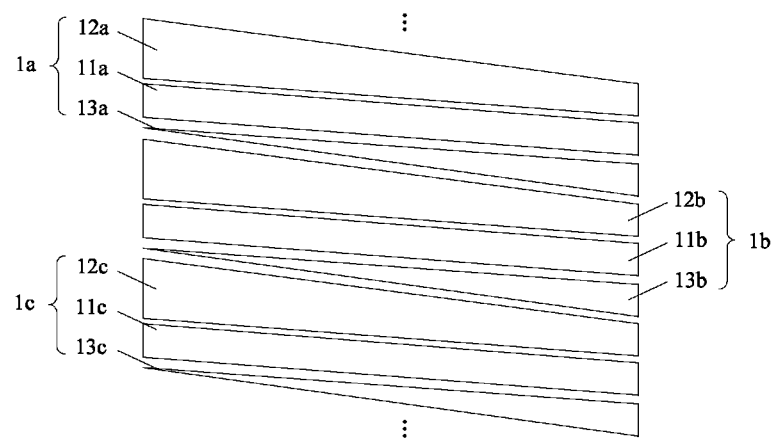
FIG. 2 is a schematic diagram of another structure of a capacitive touch panel of an embodiment of the present invention.

It should be noted that a pattern of an electrode unit depends on patterns of the first, second and third touch electrodes included in the electrode unit. The first, second and third touch electrodes may have various electrode patterns, respectively. Specifically, the pattern of the first touch electrode may be a square, rectangle, parallelogram, or other common electrode pattern; the patterns of the second and third touch electrodes may be a triangle, trapezoid, or other common electrode pattern. For example, as shown in FIG. 1, the pattern of the first touch electrode in the electrode unit is a rectangle, and the patterns of the second and the third touch electrodes in the electrode unit are triangles. As another example, as shown in FIG. 2, the pattern of the first touch electrode in the electrode unit is a parallelogram, the pattern of the second touch electrode is a trapezoid, and the pattern of the third touch electrode is a triangle. Of course, preferably, the second and third touch electrodes may have the same pattern. Here, it should be noted that, as each electrode unit may have various patterns, an electrode set formed by sequentially arranging a plurality of electrode units may also have various patterns, and those skilled in the art may adjust and choose patterns appropriate for the electrode units (or appropriate for the first, second and third touch electrodes) according to actual needs, which is not elaborated herein.

Figure 3:
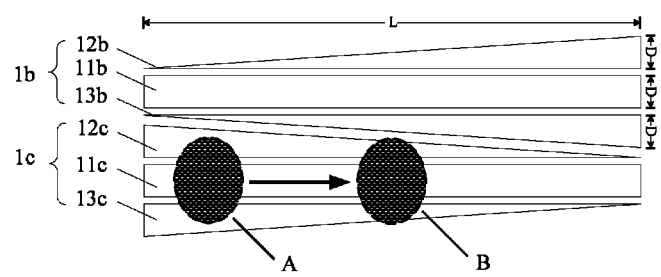
FIG. 3 is a schematic diagram illustrating touching on the capacitive touch panel of FIG. 1.

Further, specific implementation of the capacitive touch panel according to the embodiment of the present invention is provided. Taking the capacitive touch panel shown in FIG. 1 as an example, once a user's finger touches the capacitive touch panel, the movement of the user's finger may be calculated by scanning and detecting changes in capacitance values of all touch electrodes. Specifically, as shown in FIG. 3, it is assumed that the user's finger touches the above capacitive touch panel, and slides in the direction indicated by the arrow from a position where region A is located to a position where region B is located in FIG. 3. Here, to simplify description, it is assumed that both region A and region B are within the pattern of the electrode unit $1c$. Further, it is assumed that respective touch electrodes meet the following size features: the patterns of the first electrodes ($11b$, $11c$, etc.) are rectangles with a base of L and a height of D; the patterns of the second electrodes ($12b$, $12c$, etc.) are right triangles with a base of L and a height of D; the patterns of the third electrodes ($13b$, $13c$, etc.) are right triangles with a base of L and a height of D. With the above size features, the barycentric coordinates $(x1, y1)$, $(x2, y2)$ and $(x3, y3)$ of the first, second and third touch electrodes $11c$, $12c$ and $13c$ included in the electrode unit $1c$ can be obtained; in addition, the induction capacitance values corresponding to the first, second and third touch electrodes $11c$, $12c$ and $13c$ may be calculated to be C1, C2 and C3, respectively. For example, capacitance value of a parallel-plate capacitor can be calculated according to the following formula: $C = \in^* \in_0 ^* S/d$, wherein, $\in$ is the relative dielectric constant, $\in_0$ is the vacuum permittivity, S is the area of a touch electrode, and d is the distance between the upper and lower layers of the touch electrode.

When the user's finger is placed in the region A, the finger increases the conductive surface area of the capacitive touch panel, which causes the induction capacitance value of the touch electrode corresponding to the region A to be changed. For example, at this point, the induction capacitance value of the first touch electrode $11c$ is changed from C1 to C1', the induction capacitance value of the second touch electrode $12c$ is changed from C2 to C2', and the induction capacitance value of the third touch electrode $13c$ is changed from C3 to C3'. Once changes in the corresponding capacitance values are detected by scanning in the capacitive touch panel, the coordinates of the position where the touch is located can be obtained by calculation. For example, in the coordinates of the center of the region A, x-coordinate may be calculated according to the formula $x' = (x1^*C1' + x2^*C2' + x3^*C3')/(x1 + x2 + x3)$, and y-coordinate may be calculated according to the formula $y' = (y1^*C1' + y2^*C2' \pm y3^*C3')/(y1 + y2 + y3)$. Thus, by detecting the changes in capacitance values, the coordinates of the position where the touch is located are obtained by calculation, that is, the coordinates of the center of the region A are $(x', y')$.

When the user's finger moves to the region B, similar to the above process of calculating the coordinates of the center of the region A, the finger increases the conductive surface area of the capacitive touch panel, which causes the induction capacitance value of the touch electrode corresponding to the region B to be changed. It is assumed that, at this time, it is detected that the induction capacitance value of the first touch electrode 11$c$ is changed from C1 to C1", the induction capacitance value of the second touch electrode 12$c$ is changed from C2 to C2", and the induction capacitance value of the third touch electrode 13$c$ is changed from C3 to C3". Similarly, once changes in the corresponding capacitance values are detected through scanning in the capacitive touch panel, the coordinates of the position where the touch is located can be obtained by calculation. At this point, x-coordinate of the coordinates of the center of the region B may be calculated according to the formula x"=(x1*C1"+x2*C2"+x3*C3")/(x1+x2+x3), and y-coordinate may be calculated according to the formula y"=(y1*C1"+y2*C2"+y3*C3")/(y1+y2+y3). Thus, the coordinates (x", y") of the center of the region B are obtained by calculation. Here, the coordinates (x', y') and (x", y") reflect the sliding trajectory when the user's finger is touching the capacitive touch panel of the embodiment of the present invention.

Figure 4:
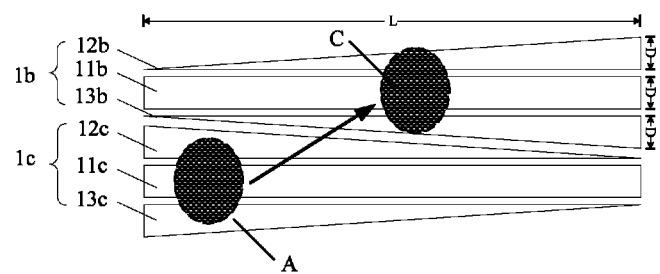
FIG. 4 is a schematic diagram illustrating another touching on the capacitive touch panel of FIG. 1.

It should be noted that the method for calculating the coordinates of the position where the touch on the capacitive touch panel is located provided in the above specific implementation is merely a possible exemplary implementation, but not the only implementation. In addition, those skilled in the art should understand that when the touch trajectory of the user's finger is in another form, for example, as shown in FIG. 4, when the user's finger slides from the region A within the electrode unit 1$c$ to region C within the electrode unit 1$b$, the capacitive touch panel provided by the embodiment of the present invention may also calculate the changes in coordinates by detecting changes in capacitance values, thus effectively determining the sliding trajectory of the touch of the user's finger.

The capacitive touch panel with the above structure provided by the embodiment of the present invention has relatively simple structure, which shortens the process procedure for manufacturing the capacitive touch panel, and lowers the production cost at the same time.

Further, in the capacitive touch panel of the embodiment of the present invention, a dummy electrode may be provided between adjacent electrode units. The dummy electrode is used to the fill the gap between patterns of the adjacent electrode units, such that intervals between patterns of adjacent electrode units are the same. Preferably, at least one layer of insulation shielding layer is further provided between the adjacent electrode units, so as to ensure the electrical insulation characteristics of each electrode unit.

Preferably, the material of the electrode unit in the capacitive touch panel provided by the embodiment of the present invention may be ITO (indium tin oxide).

Furthermore, the capacitive touch panel provided by the embodiment of the present invention may not only be used in single-touch mode, but is also effective in multi-touch mode.

According to another aspect, an embodiment of the present invention provides a display device comprising the capacitive touch panel of the above-described embodiment. The structure and working principle of the capacitive touch panel are the same as those in the above embodiment, and are not elaborated herein. In addition, the structures of the other parts of the display device may refer to the prior art, and are not described in detail herein.

Specifically, the display device provided by the embodiment of the present invention may be any product or component with display function, such as liquid crystal panel, electronic paper, liquid crystal television, liquid crystal display, digital frame, cell phone, tablet PC, or the like.

Above descriptions are only specific implementations of the present invention, but the protection scope of the present invention is not limited thereto. Modifications and substitutions that those skilled in the art can easily envisage within the scope of techniques disclosed in the present invention should fall into the protection scope of the present invention. Therefore, the protection scope of the present invention is defined by the protection scope of the appended claims.

The invention claimed is:

1. A capacitive touch panel, comprising at least one column of electrode set, the electrode set comprising a plurality of electrode units which are sequentially arranged, and adjacent electrode units complementarily matching each other, wherein each electrode unit comprises a first touch electrode, a second touch electrode and a third touch electrode, the first touch electrode, the second touch electrode and the third touch electrode complementarily match each other, and the first touch electrode is used for keeping patterns of the second touch electrode and the third touch electrode included in the same electrode unit from contacting with each other, the second touch electrode is used for keeping a pattern of the electrode unit from contacting with a pattern of an immediately previous electrode unit, the third touch electrode is used for keeping the pattern of the electrode unit from contacting with a pattern of an immediately next electrode unit, and the first touch electrode, the second touch electrode, and the third touch electrode have the same length in a direction perpendicular to a column direction.

2. The capacitive touch panel of claim 1, wherein a dummy electrode is provided between adjacent electrode units, such that intervals between adjacent electrode units are the same.

3. The capacitive touch panel of claim 2, wherein the pattern of the second touch electrode and the pattern of the third touch electrode are the same.

4. The capacitive touch panel of claim 1, wherein at least one layer of insulation shielding layer is further provided between the adjacent electrode units.

5. The capacitive touch panel of claim 4, wherein the pattern of the second touch electrode and the pattern of the third touch electrode are the same.

6. The capacitive touch panel of claim 1, wherein a material of the electrode unit is indium tin oxide.

7. The capacitive touch panel of claim 6, wherein the pattern of the second touch electrode and the pattern of the third touch electrode are the same.

8. The capacitive touch panel of claim 1, wherein a pattern of the first touch electrode is any one of square, rectangle and parallelogram; a pattern of the second touch electrode and a pattern of the third touch electrode are any one of triangle and trapezoid, respectively.

9. The capacitive touch panel of claim 8, wherein the pattern of the second touch electrode and the pattern of the third touch electrode are the same.

10. The capacitive touch panel of claim 1, wherein the pattern of the second touch electrode and the pattern of the third touch electrode are the same.

11. A display device, comprising a capacitive touch panel, wherein the capacitive touch panel comprises at least one column of electrode set, the electrode set comprising a plurality of electrode units which are sequentially arranged, and adjacent electrode units complementarily matching each other, wherein each electrode unit comprises a first touch electrode, a second touch electrode and a third touch electrode, the first touch electrode, the second touch electrode and the third touch electrode complementarily match each other, and the first touch electrode is used for keeping patterns of the second touch electrode and the third touch electrode included in the same electrode unit from contacting with each other, the second touch electrode is used for keeping a pattern of the electrode unit from contacting with a pattern of an immediately previous electrode unit, the third touch electrode is used for keeping the pattern of the electrode unit from contacting with a pattern of an immediately next electrode unit and the first touch electrode, the second touch electrode, and the third touch electrode have the same length in a direction perpendicular to a column direction.

12. The display device of claim 11, wherein a dummy electrode is provided between adjacent electrode units, such that intervals between adjacent electrode units are the same.

13. The display device of claim 12, wherein the pattern of the second touch electrode and the pattern of the third touch electrode are the same.

14. The display device of claim 11, wherein at least one layer of insulation shielding layer is further provided between the adjacent electrode units.

15. The display device of claim 14, wherein the pattern of the second touch electrode and the pattern of the third touch electrode are the same.

16. The display device of claim 11, wherein a material of the electrode unit is indium tin oxide.

17. The display device of claim 16, wherein the pattern of the second touch electrode and the pattern of the third touch electrode are the same.

18. The display device of claim 11, wherein a pattern of the first touch electrode is any one of square, rectangle and parallelogram; a pattern of the second touch electrode and a pattern of the third touch electrode are any one of triangle and trapezoid, respectively.

19. The display device of claim 18, wherein the pattern of the second touch electrode and the pattern of the third touch electrode are the same.

20. The display device of claim 11, wherein the pattern of the second touch electrode and the pattern of the third touch electrode are the same.

* * * * *